United States Patent
Koslow et al.

(10) Patent No.: US 7,182,857 B2
(45) Date of Patent: Feb. 27, 2007

(54) PRESSURE LIMITING AND/OR FLOW REGULATING VALVE FOR USE WITH POU/POE FILTER SYSTEM

(75) Inventors: Evan E. Koslow, Weston, CT (US); Donald J. Baumgarten, Cheshire, CT (US); Blake E. Savoy, Clinton, CT (US)

(73) Assignee: KX Industries L.P., Orange, CT (US)

( * ) Notice: Subject to any disclaimer, the term of this patent is extended or adjusted under 35 U.S.C. 154(b) by 415 days.

(21) Appl. No.: 10/762,702

(22) Filed: Jan. 21, 2004

(65) Prior Publication Data
US 2005/0092183 A1    May 5, 2005

Related U.S. Application Data

(60) Provisional application No. 60/516,138, filed on Nov. 3, 2003.

(51) Int. Cl.
*B01D 35/157* (2006.01)

(52) U.S. Cl. .............. 210/97; 62/318; 62/389; 137/505.13; 137/505.25; 210/418; 210/429

(58) Field of Classification Search .......... 210/97, 210/110, 137, 175, 418, 429; 137/505, 505.13, 137/505.25; 62/317, 389, 318; 222/23, 222/52, 57, 59, 189.06
See application file for complete search history.

(56) References Cited

U.S. PATENT DOCUMENTS

| | | | | |
|---|---|---|---|---|
| 5,128,035 A * | 7/1992 | Clack et al. | ........... | 210/251 |
| 5,460,719 A * | 10/1995 | Clack et al. | ........... | 210/233 |
| 5,921,275 A * | 7/1999 | Knop et al. | ........... | 137/498 |
| 6,517,615 B2 * | 2/2003 | Miller et al. | ........... | 96/421 |
| 2004/0129617 A1 * | 7/2004 | Tanner et al. | ........... | 210/110 |
| 2005/0103721 A1 * | 5/2005 | Fritze | ........... | 210/744 |

* cited by examiner

*Primary Examiner*—Joseph Drodge
(74) *Attorney, Agent, or Firm*—DeLio & Peterson, LLC; Robert Curcio

(57) ABSTRACT

An apparatus comprising a pressure limiting valve for preventing transmission of elevated pressure to components downstream of the apparatus. Preferably, the pressure limiting valve is used in combination with a flow regulating device that maintains a substantially steady flow rate through the apparatus even when subject to a wide range of applied pressure. The apparatus of the present invention is preferably suitable for use with filter systems wherein the pressure limiting valve is placed upstream of filter components that have limited burst and fatigue life capabilities. By isolating the downstream filter components from pressures that are greater than the target pressure range for a given application, the filter components can be designed to operate at much lower pressure, can be produced at a smaller size, and at a reduced cost.

27 Claims, 2 Drawing Sheets

PRESSURE LIMITING AND/OR FLOW REGULATING VALVE FOR USE WITH POU/POE FILTER SYSTEM

This application claims the benefit of U.S. Provisional Patent Application No. 60/516,138, filed on 3 Nov. 2003, which is herein incorporated by reference in its entirety.

This invention is directed to point-of-use (POU) or point-of-entry (POE) filter systems having a pressure limiting and/or flow regulating valve, such that the filter system, particularly the housing, is protected from exposure to extreme pressure and operates at a selected flow rate throughout a broad range of operating pressures.

SUMMARY OF THE INVENTION

The present invention is directed to, in a first aspect, a valve comprising: means for regulating flow of a fluid through the apparatus and downstream components of the valve; a chamber having an inlet and an outlet, the chamber in fluid communication with the means for regulating flow when the valve is in an open position; means for sensing pressure located downstream from the inlet of the chamber; and means for preventing transmission of elevated pressure to downstream components of the valve, the means for preventing transmission of elevated pressure in mechanical communication with the means for sensing pressure, wherein upon exposure to a pressure greater than a target pressure range the means for sensing pressure triggers the means for preventing transmission of elevated pressure to block the inlet to the chamber, and wherein upon subsequent exposure to a pressure lower than the target pressure range, the means for sensing pressure triggers the means for preventing transmission of elevated pressure to open the inlet to the chamber.

The means for preventing transmission of elevated pressure to downstream components can block the inlet to the chamber thereby isolating downstream components of the valve from pressure values that exceed a burst or fatigue life of the downstream components. The means for preventing transmission of elevated pressure to downstream components and the means for sensing pressure may comprise a pressure actuated piston located within the chamber, wherein the pressure actuated piston comprises: a shut off tip to reversibly block the inlet to the chamber to terminate further pressure increases inside the chamber; a shaft extending from the shut off tip, the shaft in fluid communication with the inlet and outlet to the chamber unless the shut off tip is engaged blocking the inlet to the chamber; and a pressure actuating surface responsive to pressure entering the apparatus, distal from the shut off tip, upon which a pressure greater than the target pressure range of the apparatus causes movement of the pressure actuated piston causing the shut off tip to block the inlet to the chamber. The inlet to the chamber may further include a nozzle and wherein upon exposure to a pressure greater than a target pressure range, the shut off tip is seated within the nozzle thereby blocking the inlet to the chamber. The valve may further include a spring means such that pressure downstream of the valve drops to a pressure lower than the target pressure range, the spring means assists in moving the pressure actuated piston to disengage the shut off tip from the inlet to the chamber. Preferably, the shaft extending from the shut off tip has a flow-through core. The means for regulating flow can be upstream or downstream from the chamber. Preferably, the valve further includes a filter system located downstream of the valve. The filter system may comprise filter components having an insufficient burst strength or fatigue life to withstand about 300 psi pressure or 100,000 cycles of 150 psi pressure-depressurization cycles. Preferably, the filter system is located in a refrigerator, and may further include a filtered fluid dispenser.

In yet another aspect, the present invention is directed to an apparatus comprising: means for preventing transmission of elevated pressure to downstream components of the apparatus; and means for sensing pressure downstream from the means for preventing transmission of elevated pressure, wherein upon exposure to a pressure greater than a target pressure range, the means for sensing pressure triggers the means for preventing transmission of elevated pressure to reversibly isolate downstream components of the apparatus from pressure greater than the target pressure range for a period until a pressure less than the target pressure range is re-established.

The apparatus of the present invention may further include means for regulating flow of a fluid through the apparatus and downstream components thereof. Preferably, the means for regulating flow maintains a narrow target flow rate within a wide range of applied pressure. The means for regulating flow may comprise a flow control orifice with a floating O-ring such that a substantially steady flow rate is maintained within the target pressure range. Upon subsequent exposure to a pressure less than the target pressure range, the means for preventing transmission of elevated pressure terminates isolation of the downstream components of the apparatus.

In still yet another aspect, the present invention is directed to an apparatus for removing contaminants from a liquid comprising: filter components; a pressure limiting valve, upstream from the filter components, the pressure limiting valve comprising: means for preventing transmission of elevated pressure to downstream components of the apparatus; and means for sensing pressure downstream from the means for preventing transmission of elevated pressure; and means for regulating flow of the liquid through the apparatus, the means for regulating flow located upstream or downstream of the pressure limiting valve; wherein upon exposure to a pressure greater than a target pressure range, the means for sensing pressure triggers the means for preventing transmission of elevated pressure to the filter components to reversibly isolate the filter components from the pressure greater than the target pressure range for a period until a pressure less than the target pressure range is re-established.

The filter components may comprise a housing having insufficient burst strength or fatigue life to withstand about 300 psi pressure or 100,000 cycles of 150 psi pressure-depressurization cycles. Preferably, the filter components comprise a diffusive filtration medium that is capable of removing heavy metals, chemical and microbiological contaminants. Preferably, the pressure limiting valve isolates the filter components from pressures greater than or equal to about 60 to about 120 psi. Preferably, the pressure limiting valve and the means for regulating flow of the liquid through the apparatus are combined in a single device Preferably, the filter components and the pressure limiting valve are located inside an appliance, and may further include a filtered liquid dispenser. Preferably, the filtered liquid dispenser, when actuated by a user, relieves pressure within the pressure limiting valve that is sensed by the means for sensing pressure to trigger the means for preventing pressure increases to reverse isolation of the filter components.

In a further aspect, the present invention is directed to an apparatus for removing contaminants from a liquid comprising: a valve to prevent and sense pressure increases in components downstream from the valve such that the apparatus for removing contaminants can meet burst and fatigue life requirements for a given filtration application; a flow regulator in liquid communication with the valve to provide a substantially fixed rate of flow-through the apparatus for removing contaminants within a target pressure range that allows adequate reduction of contaminants throughout the target pressure range; and filter components downstream from the valve, the components including a housing and a diffusive filtration medium contained within the housing, wherein the filter components have insufficient structural integrity to meet burst and fatigue life requirements for the given filtration application, wherein upon exposure to a pressure greater than the target pressure range, the valve isolates the filter components and prevents transmission of the pressure greater than the target pressure range to the filter components until a pressure equal to or less than the target pressure range is re-established.

Preferably, the diffusive filtration medium removes heavy metals, chemical contaminants, microbiological contaminants, or combinations thereof. Preferably, the valve comprises: a chamber having an inlet and an outlet; and a pressure actuated piston situated within the chamber, the piston comprising: a shut off tip that reversibly blocks the inlet to the chamber to isolate the filter components from pressure greater than the target pressure range; a shaft extending from the shut off tip, the shaft in fluid communication with the chamber unless the shut off tip is engaged thereby blocking the inlet to the chamber; a pressure actuating surface responsive to pressure entering the chamber, the pressure actuating surface distal from the shut off tip, wherein a pressure greater than the target pressure range causes movement of the pressure actuated piston causing the shut off tip to block the inlet to the chamber; and a spring means to assist in moving the pressure actuated piston to disengage the shut off tip from the inlet to the chamber.

BRIEF DESCRIPTION OF THE DRAWINGS

The features of the invention believed to be novel and the elements characteristic of the invention are set forth with particularity in the appended claims. The figures are for illustration purposes only and are not drawn to scale. The invention itself, however, both as to organization and method of operation, may best be understood by reference to the description of the preferred embodiment(s) that follows taken in conjunction with the accompanying drawings in which:

DETAILED DESCRIPTION OF THE PREFERRED EMBODIMENT(S)

Figure 1:
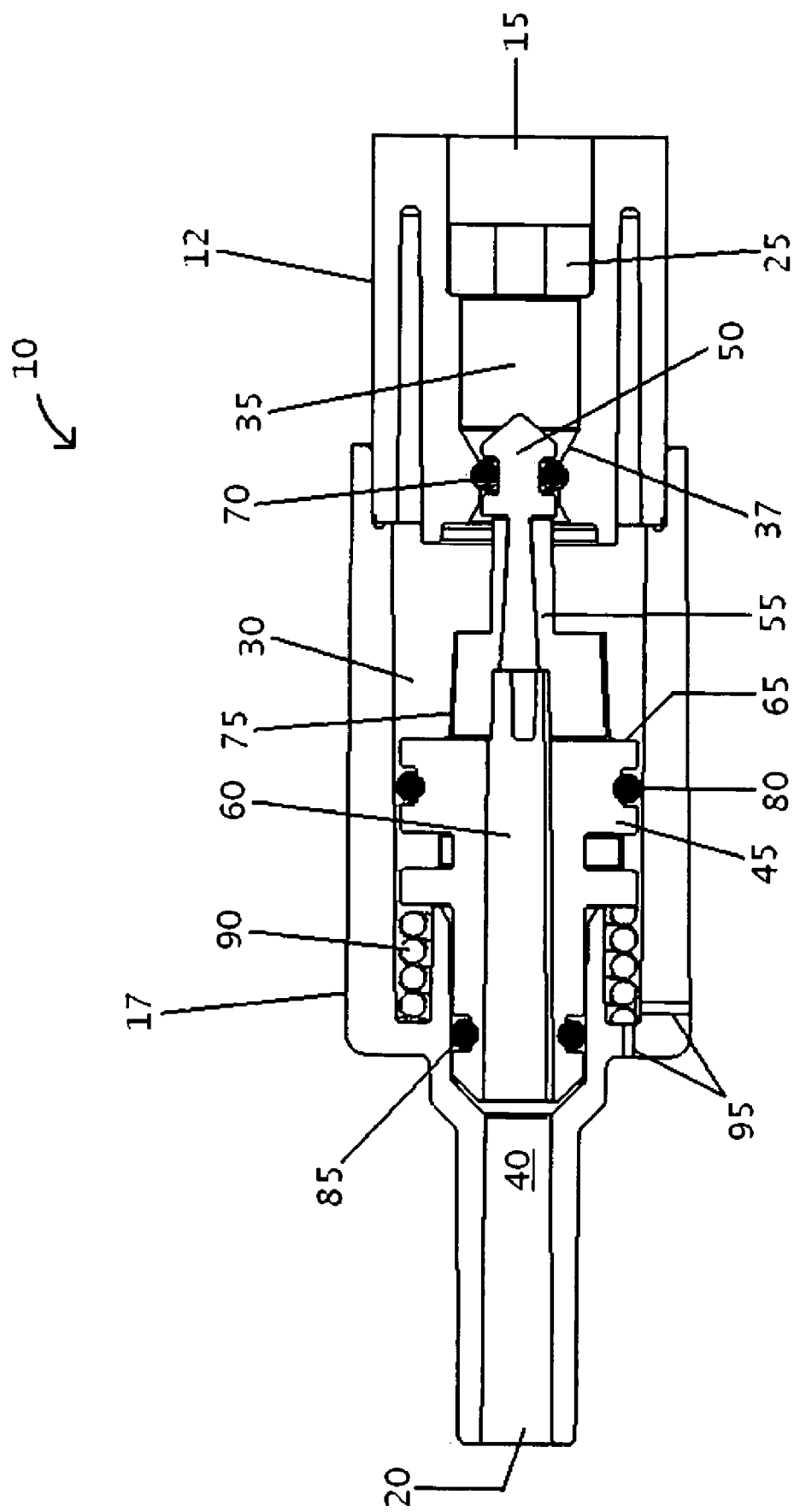
FIG. 1 is a cross-sectional view of an embodiment of an apparatus of the present invention wherein the pressure limiting valve is in the closed position.

In describing the preferred embodiment of the present invention, reference will be made herein to FIGS. 1–2 of the drawings in which like numerals refer to like features of the invention. Features of the invention are not necessarily shown to scale.

An apparatus of the present invention comprises a mechanism that prevents exposure to elevated pressures into a filter system alone or in combination with a mechanism that regulates flow rate through the filter system. Such apparatus is preferably useful in a filter system for removing chemical or microbiological contaminants from a fluid using diffusive interception. A commercially available filter system, having a housing and one or more filtration media contained within the housing, is typically certified by such organizations as NSF International, Inc., state health departments, and other regulatory bodies that the system meets certain performance standards and/or health claims. For example, a burst test of the filter system is conducted by exposing the filter system to a pressure of about 300 psi and holding the system at that pressure for an extended period of time. Fatigue testing, as another example, is where the filter system is subject to 100,000 pressurization-depressurization cycles at a pressure of 150 psi. These extensive burst pressure and fatigue life requirements necessitate that the filter housings be massive and expensive even though the filtration medium within the housing can actually operate at very low pressures without difficulty. By preventing exposure to elevated pressures, the filter housing can be designed to operate at much lower pressure, can be produced at a smaller size, and at a reduced cost.

Typical flow controllers do little to prevent damage to the filter system when the system is exposed to elevated pressures, but do provide the needed empty bed contact time for effective diffusive filtration. Minimum contact time between the influent fluid and the filtration medium is required when using adsorption or diffusive interception where an impurity must be provided sufficient time to diffuse to the surface of the filtration medium. To accomplish the efficient reduction of a contaminant, flow rate through the filtration medium must be regulated and provide sufficient contact time even if the pressure entering the system and/or the driving flow-through the system varies by a wide margin.

An apparatus of the present invention can be included with such filter systems as point-of-use or point-of-entry systems. Point-of-use water filter systems are used to treat water, or other fluids, at a single tap or multiple taps, but are not used to treat the water for an entire facility. Point-of-entry water filter systems are used to treat all or part of the water at the inlet to a facility. The filter system, might, for example, be designed to remove microbiological contaminants and/or chemical contaminants. In order to remove such contaminants by adsorption-type phenomena, there must be sufficient contact time between the influent and the filtration medium to ensure successful diffusive interception. Exemplary filter systems are disclosed in co-pending U.S. patent application Ser. No. 10/286,695, filed on 1 Nov. 2002, and U.S. Pat. No. 6,630,016, both assigned to the assignee of the present invention.

Filter system components, such as the filter housing that contains the filtration medium, are typically constructed of metal or plastic and must withstand three to four times its normal maximum operating pressure during testing. Typically, the operating pressure of the filter system is about 25 to about 80 psi. However, the filter system can be exposed to elevated pressures of about 80 to about 120 psi, and higher. By preventing exposure to elevated pressures, the filter housing need not be as ruggedly constructed as current housings, or can be made from materials that are less expensive, and of lower strength.

The apparatus of the present invention prevents pressure increases from entering the downstream filter system when influent pressures exceed about 60 to about 120 psi, or higher. The apparatus may further include a mechanism for regulating flow entering the filter system such that a relatively constant flow rate within a narrow target range is maintained throughout a wide range of applied pressure.

Such devices that prevent exposure to elevated pressure will be referred to herein as pressure limiting valves, are located upstream from the filter system and components, and work to isolate the filter system and the downstream components from the elevated pressure when a sensing means senses an increase in the pressure entering the valve and thereby triggers an isolation mechanism. When the pressure within the filter system is below such elevated pressure, the valve re-opens and isolation of the filter system is terminated in direct response to the sensing means. Preferably, the valve operates without any manual intervention, but is directly responsive to fluid pressures encountered by the pressure limiting valve.

FIG. 1 is an illustration of one embodiment of the pressure limiting valve 10 of the present invention in the closed valve position. Valve 10 has an upper housing 12 with a valve inlet 15 and a lower housing 17 with a valve outlet 20. Upper housing 12 and lower housing 17 are preferably sonically welded together although alternative methods of attaching the two housings together can be used and are well known in the art. Both housings can be from metal or polymeric materials such as acrylonitrile-butadiene-styrene copolymer (ABS). As depicted in FIG. 2, filter system components are located downstream from valve outlet 20. Filter system components include, but are not limited to, a filter 110 housing containing a filtration medium 115, necessary tubing, fluid dispensing system 130, and the like. Preferably, the filtration medium is 115 capable of removing either or both chemical contaminants such as organic chemicals, and heavy metals; and microbiological contaminants such as protozoan cysts, bacteria, and viral particles. Preferably, the filtration medium operates by diffusion. Such downstream filter components are likely to withstand a target pressure range exceeding 60 to 120 psi, but cannot handle the elevated flow rate that would result if the pressure is allowed to directly motivate the fluid in the absence of flow restriction or control.

As a fluid enters upper housing 12 of valve 10 through valve inlet 15, the fluid enters a flow regulator 25 that controls and regulates fluid flow entering valve 10 and consequently into the downstream filter system components, particularly the filter medium. Flow regulator 25 can be a flow restricting device such as those commercially available from Neoperl, Inc, Waterbury, Conn., in a variety of sizes and flow rates wherein a floating O-ring provides the advantage of maintaining a narrow target flow rate through the orifice within a wide range of applied pressure. Flow regulation is particularly important when the downstream filter medium utilizes diffusion as a mechanism for removing contaminants such as heavy metals, chemicals, or microbiological particles by adsorption to ensure sufficient contact time for effective diffusion of the contaminants to a surface of the filter medium while maintaining a relatively steady flow rate within a wide range of applied pressure. Fluid flows through flow regulator 25 into a chamber 30 within lower housing 17 of valve 10. Although flow regulator 25 is shown in this embodiment as being upstream from chamber 30, it can be located either upstream or downstream of the filter system to provide sufficient influent contact time with the diffusive filter medium.

Within lower housing 17, chamber 30 has a chamber inlet 35 where upper housing 12 and lower housing 17 join together, and a chamber outlet 40 that is in fluid communication with valve outlet 20. A portion of chamber inlet 35 is a nozzle 37 that indents into a smaller opening than the remaining portion of chamber inlet 35. Within chamber 30 is a means for sensing and preventing pressure increases entering the downstream filter components. Such means may comprise a pressure actuated piston 45. Pressure actuated piston 45 has a shut off tip 50, a shaft 55 extending from shut off tip 50 having a flow-through core 60, and a pressure actuating surface 65. Given the potentially narrow shaft and small circumference of the shut off tip, it is preferable to manufacture the pressure actuated piston from a stronger material than the housings. For example, pressure actuated piston 45 can be made with polycarbonate.

When pressure entering valve 10 is within or below the target pressure range, valve 10 remains in an open position whereby fluid flowing into valve 10 through valve inlet 15 enters flow controller 25. Shut off tip 50 is situated within chamber inlet 35, but not within nozzle 37, such that fluid can flow around shut off tip 50 and enter chamber 30. Preferably, shut off tip 60 has a substantially conical or frustoconical shape to direct fluid flow around shut off tip 60. The fluid then flows around shaft 55 and through flow-through core 60 to exit chamber outlet 40 and subsequently valve outlet 20. Web supports 75 can provide structural integrity to pressure actuated piston 45. O-rings 80, 85 provide a substantially leak-proof seal around pressure actuated piston 45 to divert fluid flow through flow-through core 60. A spring 90, surrounding pressure actuated piston 45 provides the necessary counter-force to move pressure actuated piston 45 towards valve inlet 15 such that shut off tip 50 is no longer engaged within nozzle 37 thereby opening valve 10. Preferably, the portion of chamber 30 where spring 90 resides is open to atmospheric pressure at slots 95 such that only the force of spring 90 is acting upon pressure actuated piston 45 without additional forces from any gas trapped within the space surrounding spring 90. Thus, fluid flowing into valve 10 enters flow regulator 25, into chamber 30, directed through flow-through core 60, and subsequently to the downstream filter components.

When pressure greater than the target pressure range is encountered by valve 10, the pressure is sensed by pressure actuating surface 65. The elevated pressure entering chamber 30 acts against pressure actuating surface 65 to force pressure actuated piston 45 to move towards valve outlet 20 such that shut off tip 50 is engaged and lodged within nozzle 37 of chamber inlet 35. An O-ring 70 surrounding shut off tip 50 provides a substantially leak-proof seal such that fluid flow is terminated in chamber 30 and the elevated pressure cannot enter chamber 30. The elevated pressure is not transmitted further into the chamber, and the downstream filter components are isolated and protected from the elevated pressure. Shut off tip 50 reversibly blocks chamber inlet 35 to terminate pressure greater than the target pressure range from impacting the downstream filter components. By terminating pressure greater than the target pressure range from entering chamber 30, the downstream filter components are isolated from elevated pressures that would exceed the burst strength and/or fatigue life of the filter components.

As pressure actuating surface 65 of pressure actuated piston 45 senses a lower pressure that is within the target pressure range, spring 90 forces pressure actuated piston 45 towards valve inlet 15 and shut off tip 50 is dislodged from nozzle 37. The pressure can be lowered when the downstream filter system is opened to the atmosphere when, for example, a user is withdrawing filtered fluid from the filter system. Once the user discontinues withdrawing the filtered fluid, the closed filter system is re-pressurized until the pressure exceeds the target pressure range. When the pressure actuating surface 65 senses the elevated pressure, the pressure actuated piston 45 once again moves toward valve inlet 15 to engage shut off tip 50 within nozzle 37 to isolate the downstream filter system and components thereof from the increasing pressure.

The apparatus of the present invention can be incorporated into an appliance, for example, a refrigerator having a filter system. Within the refrigerator, where space is a paramount concern, by minimizing or preventing exposure of the filter components to pressure increases, the filter components no longer need to meet excessively stringent structural integrity requirements to withstand 300 psi of pressure or 100,000 cycles of 150 psi pressurization/depressurization. The filter components can now be designed to operate at the lower maximum pressure of the pressure limiting valve by incorporating the apparatus of the present invention upstream of the filter system. By combining the pressure limiting valve with a flow regulating mechanism, filter systems are not exposed to elevated flow rates so that filter media that work by diffusive methods can operate more efficiently to remove chemical and microbiological contaminants. Manufacturing costs of the filter housing and other components can be substantially lower by using lower cost materials and reduced wall thicknesses.

While the present invention has been particularly described, in conjunction with a specific preferred embodiment, it is evident that many alternatives, modifications and variations will be apparent to those skilled in the art in light of the foregoing description. It is, therefore, contemplated that the appended claims will embrace any such alternatives, modifications and variations as falling within the true scope and spirit of the present invention.

What is claimed is:

1. Apparatus comprising a valve, the valve comprising:
    means for regulating flow of a fluid through said apparatus and to downstream components;
    a chamber having an inlet and an outlet, said chamber in fluid communication with said means for regulating flow when said valve is in an open position;
    means for sensing pressure located downstream from the inlet of said chamber; and
    means for preventing transmission of elevated pressure to said downstream components of said apparatus, said means for preventing transmission of elevated pressure in mechanical communication with said means for sensing pressure, wherein upon exposure to a pressure greater than a target pressure range said means for sensing pressure triggers said means for preventing transmission of elevated pressure to block the inlet to the chamber, and wherein upon subsequent exposure to a pressure lower than the target pressure range, said means for sensing pressure triggers said means for preventing transmission of elevated pressure to open the inlet to the chamber; and
    wherein said means for preventing transmission of elevated pressure to downstream components and said means for sensing pressure comprises a pressure actuated piston located within said chamber, wherein said pressure actuated piston comprises:
    a shut off tip to reversibly block the inlet to said chamber to terminate further pressure increases inside said chamber;
    a shaft extending from the shut off tip, the shaft in fluid communication with the inlet and outlet to said chamber unless the shut off tip is engaged blocking the inlet to said chamber; and
    a pressure actuating surface responsive to pressure entering said apparatus, distal from the shut off tip, upon which a pressure greater than the target pressure range of said apparatus causes movement of said pressure actuated piston causing the shut off tip to block the inlet to said chamber.

2. A apparatus of claim 1 wherein said means for preventing transmission of elevated pressure to downstream components blocks the inlet to said chamber thereby isolating downstream components of said valve from pressure values that exceed a burst or fatigue life of the downstream components.

3. A apparatus of claim 1 wherein the inlet to said chamber further includes a nozzle and wherein upon exposure to a pressure greater than a target pressure range, the shut off tip is seated within the nozzle thereby blocking the inlet to said chamber.

4. A apparatus of claim 1 further including a spring means such that pressure downstream of said valve drops to a pressure lower than the target pressure range, said spring means assists in moving said pressure actuated piston to disengage the shut off tip from the inlet to said chamber.

5. A apparatus of claim 1 wherein the shaft extending from the shut off tip has a flow-through core.

6. A apparatus of claim 1 wherein said means for regulating flow is upstream or downstream from said chamber.

7. A apparatus of claim 1 further including a filter system located downstream of said valve.

8. A combination of claim 7 wherein said filter system comprises filter components having an insufficient burst strength or fatigue life to withstand about 300 psi pressure or 100,000 cycles of 150 psi pressure-depressurization cycles.

9. A combination of claim 7 wherein said filter system is located in a refrigerator.

10. A combination of claim 7 further including a filtered fluid dispenser.

11. An apparatus comprising:
    pressure valve for preventing transmission of fluid to downstream components of said apparatus, said pressure valve having an inlet for influent flow and an outlet for effluent flow, and reversibly isolating said downstream components from pressure at said inlet greater than a target pressure range for a period until a pressure less than said target pressure range is re-established, said pressure valve including:
    an upper housing comprising:
        a valve inlet;
        a chamber inlet; and
        a nozzle-shaped port;
    a lower housing comprising:
        a chamber outlet;
        a piston having a flow-through core and a pressure actuating surface, said piston connected to a shaft having a shut off tip capable of sealing said nozzle-shaped port; and
        a spring in mechanical communication with said piston, biased to compress when a pressure in said chamber inlet is greater than a pressure at said outlet, such that when said spring is compressed under said greater pressure, said shut off tip seals said nozzle-shaped port, terminating fluid flow at said chamber inlet.

12. An apparatus of claim 11 further including a flow regulator for regulating flow of a fluid through said apparatus and downstream components thereof.

13. An apparatus of claim 12 wherein said flow regulator maintains a narrow target flow rate within a wide range of applied pressure.

14. An apparatus of claim 12 wherein said flow regulator comprises a flow control orifice with a floating O-ring such that a substantially steady flow rate is maintained within the target pressure range.

15. An apparatus of claim 11 wherein upon subsequent exposure to a pressure less than the target pressure range, said pressure valve terminates fluid flow to said downstream components of said apparatus.

16. An apparatus of claim 11 further including a filter system.

17. An apparatus for removing contaminants from a liquid comprising:
 filter components;
 a pressure limiting valve, upstream from said filter components, said pressure limiting valve comprising;
  a piston having a flow-through core and a pressure actuating surface, said piston connected to a shaft having a shut off tip for sealing a nozzle-shaped port; and
  a spring in communication with said piston, biased to compress when a pressure in a chamber inlet is greater than a pressure at an outlet, such that when said spring is compressed under said greater pressure, said shut off tip seals said nozzle-shaped port, terminating fluid flow at said chamber inlet; and
 a flow regulator for regulating flow of the liquid through said apparatus, said flow regulator located upstream or downstream of said pressure limiting valve;
wherein upon exposure to a pressure greater than a target pressure range, said valve shuts off fluid flow to said filter components and reversibly isolates said filter components from fluid flow for a period until a pressure less than the target pressure range is re-established.

18. An apparatus of claim 17 wherein said filter components comprise a housing having insufficient burst strength or fatigue life to withstand about 300 psi pressure or 100,000 cycles of 150 psi pressure-depressurization cycles.

19. An apparatus of claim 17 wherein said filter components comprise a diffusive filtration medium.

20. An apparatus of claim 17 wherein said filter components comprise a filtration medium capable of removing heavy, metals, chemical and microbiological contaminants.

21. An apparatus of claim 17 wherein said pressure limiting valve isolates said filter components from pressures greater than or equal to about 60 to about 120 psi.

22. An apparatus of claim 17 wherein said pressure limiting valve and said flow regulator are combined in a single device.

23. An apparatus of claim 17 wherein said filter components and said pressure limiting valve are located inside an appliance.

24. An apparatus of claim 23 wherein the appliance further comprises a filtered liquid dispenser.

25. An apparatus of claim 24 wherein the filtered liquid dispenser, when actuated by a user, relieves pressure within said pressure limiting valve that is sensed by the means for sensing pressure to trigger the means for preventing pressure increases to reverse isolation of said filter components.

26. An apparatus for removing contaminants from a liquid comprising:
 a valve having an inlet for influent fluid flow and an outlet for effluent fluid flow, said valve prevents and senses pressure increases in components downstream from said valve such that said apparatus for removing contaminants can meet burst and fatigue life requirements for a given filtration application;
 a flow regulator in liquid communication with said valve to provide a substantially fixed rate of flow-through said apparatus for removing contaminants within a target pressure range that allows adequate reduction of contaminants throughout the target pressure range; and
 filter components downstream from said valve, said components including a housing and a diffusive filtration medium contained within said housing, wherein said filter components have sufficient structural integrity to meet burst and fatigue life requirements for the given filtration application, wherein upon exposure at said pressure at said valve inlet greater than a target pressure range for said valve outlet, said valve isolates said filter components and prevents fluid flow and transmission of said pressure greater than said target pressure range to said filter components, until a pressure equal to or less than the target pressure range is re-established; and wherein said valve further comprises:
 a chamber comprising said inlet and outlet; and
 a pressure actuated piston situated within the chamber, the piston comprising:
  a shut off tip that reversibly blocks the inlet to the chamber to isolate said filter components from said fluid flow and from pressure greater than the target pressure range;
  a shaft extending from the shut off tip, the shaft in fluid communication with said chamber unless the shut off tip is engaged thereby blocking the inlet to said chamber and stopping fluid flow;
  a pressure actuating surface responsive to pressure entering the chamber, the pressure actuating surface distal from the shut off tip, wherein a pressure greater than the target pressure range causes movement of said pressure actuated piston causing the shut off tip to block the inlet to said chamber and terminate fluid flow; and
  a spring means to assist in moving the pressure actuated piston to disengage the shut off tip from the inlet to the chamber.

27. An apparatus of claim 26 wherein the diffusive filtration medium removes heavy metals, chemical contaminants, microbiological contaminants, or combinations thereof.

* * * * *

UNITED STATES PATENT AND TRADEMARK OFFICE
CERTIFICATE OF CORRECTION

Figure 2:
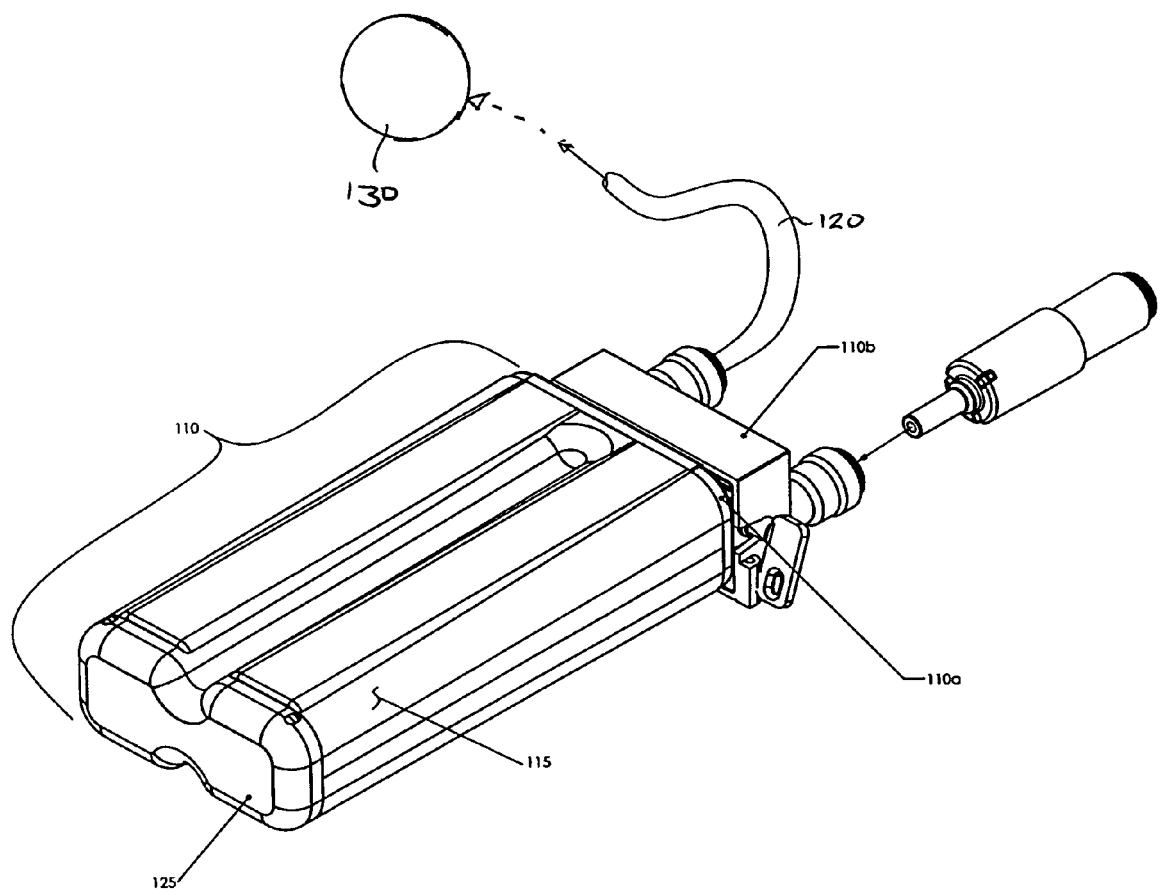
FIG. 2 is a side-plan view of a filter assembly of the present invention.
Figure 2:
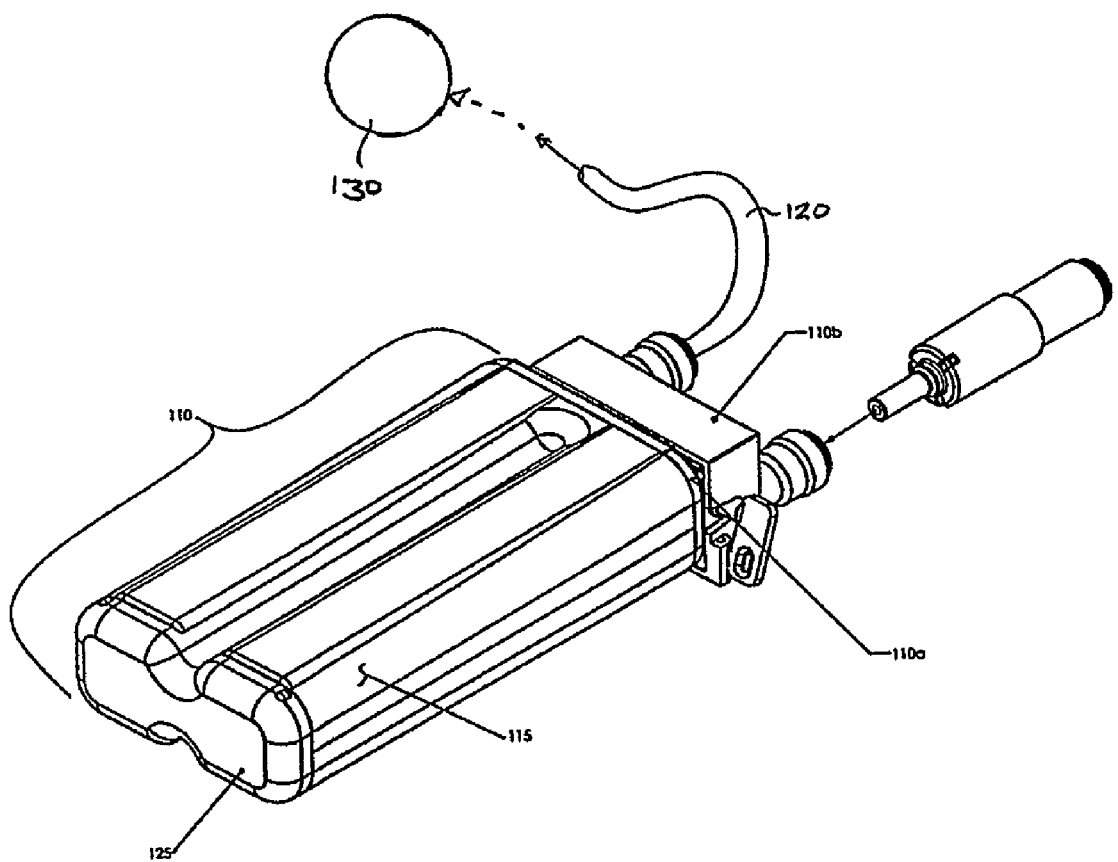

PATENT NO. : 7,182,857 B2
APPLICATION NO. : 10/762702
DATED : February 27, 2007
INVENTOR(S) : Evan E. Koslow It is certified that error appears in the above-identified patent and that said Letters Patent is hereby corrected as shown below:

Delete drawing sheet 2 of 2 and substitute therefor the drawing sheet, consisting of fig. 2 as shown on the attached page.

Signed and Sealed this

Eleventh Day of September, 2007

JON W. DUDAS
*Director of the United States Patent and Trademark Office*